US012759518B2

(12) United States Patent
Kodani et al.

(10) Patent No.: US 12,759,518 B2
(45) Date of Patent: Oct. 13, 2026

(54) VEHICLE BRAKING CONTROL APPARATUS

(71) Applicant: TOYOTA JIDOSHA KABUSHIKI KAISHA, Toyota (JP)

(72) Inventors: Shimpei Kodani, Okazaki (JP); Masahiro Hara, Miyoshi (JP); Hiroaki Endo, Suntou-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 46 days.

(21) Appl. No.: 18/923,279

(22) Filed: Oct. 22, 2024

(65) Prior Publication Data

US 2025/0136072 A1 May 1, 2025

(30) Foreign Application Priority Data

Oct. 25, 2023 (JP) ................................ 2023-183001

(51) Int. Cl.
*B60T 8/1755* (2006.01)
*B60T 8/171* (2006.01)
(Continued)

(52) U.S. Cl.
CPC .......... *B60T 8/17551* (2013.01); *B60T 8/171* (2013.01); *B60T 8/17616* (2013.01);
(Continued)

(58) Field of Classification Search
CPC .. B60T 8/171; B60T 8/17551; B60T 8/17616; B60T 8/17636; B60T 2210/12; B60T 2230/03; B60T 2230/04
See application file for complete search history.

(56) References Cited

U.S. PATENT DOCUMENTS

| | | | | |
|---|---|---|---|---|
| 5,292,188 A | | 3/1994 | Okazaki | |
| 6,053,583 A | * | 4/2000 | Izumi | B60T 8/17552 701/91 |
| 10,358,128 B2 | * | 7/2019 | Yoneda | B60T 8/17 |

FOREIGN PATENT DOCUMENTS

| | | |
|---|---|---|
| JP | H05-69812 A | 3/1993 |
| JP | 07-117652 A | 5/1995 |

(Continued)

OTHER PUBLICATIONS

Mizoguchi, JP 2010-018250, machine translation. (Year: 2010).*

*Primary Examiner* — Mark L. Greene
(74) *Attorney, Agent, or Firm* — Sughrue Mion, PLLC

(57) ABSTRACT

A vehicle braking control apparatus includes a controller and a determiner. The controller is configured to switch between a braking-force generating control and a braking-force release control. The controller causes a braking device mounted on a vehicle to generate a braking force in the braking-force generating control and causes the braking device to release the generated braking force in the braking-force release control. The determiner is configured to determine whether an unstable-behavior with rotation around a rotation axis along a vertical direction occurs or not in the vehicle based on a determination-value determined by a state occurred in the vehicle and a state of a road surface with which wheels of the vehicle are in contact. The controller causes the braking device to generate the braking force by executing the braking-force generating control when the determiner determines that the unstable-behavior occurs.

3 Claims, 5 Drawing Sheets

(51) Int. Cl.
*B60T 8/1761* (2006.01)
*B60T 8/1763* (2006.01)

(52) U.S. Cl.
CPC ....... *B60T 8/17636* (2013.01); *B60T 2210/12* (2013.01); *B60T 2250/03* (2013.01); *B60T 2250/04* (2013.01)

(56) References Cited

FOREIGN PATENT DOCUMENTS

| | | | | |
|---|---|---|---|---|
| JP | H08-99624 | A | | 4/1996 |
| JP | 10-35464 | A | | 2/1998 |
| JP | 2010018250 | A | * | 1/2010 |
| JP | 2012-011833 | A | | 1/2012 |

* cited by examiner

VEHICLE BRAKING CONTROL APPARATUS

REFERENCE TO RELATED APPLICATIONS

This application claims priority from Japanese Patent Application No. 2023-183001 filed on Oct. 25, 2023. The entire content of the priority application is incorporated herein by reference.

TECHNICAL FIELD

The present disclosure relates to a vehicle braking control apparatus.

BACKGROUND ART

Conventionally, for example, an anti-skid control apparatus disclosed in Japanese Patent Application Publication No. JP-A-10-35464 (hereinafter referred to as "conventional control apparatus") has been proposed. The conventional control device is configured to determine that a pressure reduction mode is continued in accordance with an anti-skid control, and determine whether or not an unstable behavior with rotation occurs in the vehicle based on respective decrease gradients of a wheel speed and a vehicle speed.

SUMMARY

The conventional control apparatus determines whether or not the unstable behavior with rotation is occurring in the vehicle based on a pressure reduction mode in accordance with the anti-skid control. Incidentally, for example, in the vehicle, in order to resolve the unstable behavior in the middle of it or to determine a turn of the vehicle that does not lead to the unstable behavior, an amount of time for determining the unstable behavior is required. In this regard, in the conventional control apparatus, for example, when the driver brakes with a delay, the time when the pressure reduction mode is started is also delayed, and thus there is a possibility that the time required for the determination of the unstable behavior cannot be secured. As a result, the conventional control apparatus may not be able to determine the unstable behavior.

An object of the present disclosure is to provide a vehicle braking control apparatus capable of early determining whether or not an unstable behavior with rotation occurs in a vehicle.

An aspect of the present disclosure relates to a vehicle braking control apparatus including a controller and a detector. The controller is configured to switch between a braking-force generating control and a braking-force release control so as to execute the braking-force generating control and the braking-force release control. The controller causes a braking device mounted on a vehicle to generate a braking force in the braking-force generating control and causes the braking device to release the generated braking force in the braking-force release control. The determiner is configured to determine whether an unstable-behavior with rotation around a rotation axis along a vertical direction occurs or not in the vehicle based on a determination-value determined by a state occurred in the vehicle and a state of a road surface with which wheels of the vehicle are in contact. The controller causes the braking device to generate the braking force by executing the braking-force generating control when the determiner determines that the unstable-behavior occurs.

According to the vehicle braking control apparatus of the present disclosure, the determiner can determine whether or not the unstable behavior with rotation occurs in the vehicle based on a determination value. That is, in the vehicle braking control apparatus, it is possible to determine whether or not the unstable behavior accompanied by the rotation of the vehicle occurs at an early stage even before braking. Accordingly, the vehicle braking control apparatus can cause the controller to promptly execute a braking-force-generating control, and as a result, it is possible to promptly stop the vehicle in which the unstable behavior accompanied by rotation occurs.

BRIEF DESCRIPTION OF DRAWINGS

The objects, features, advantages, and technical and industrial significance of the present disclosure will be better understood by reading the following detailed description of an embodiment, when considered in connection with the accompanying drawings, in which.

DESCRIPTION

Hereinafter, there will be described a vehicle braking control apparatus 10 according to an embodiment of the present disclosure in detail with reference to the drawings. In addition to the embodiments described below, the vehicle braking control apparatus may be implemented in various forms subjected to various changes and improvements based on the knowledge of those skilled in the art.

Figure 1:
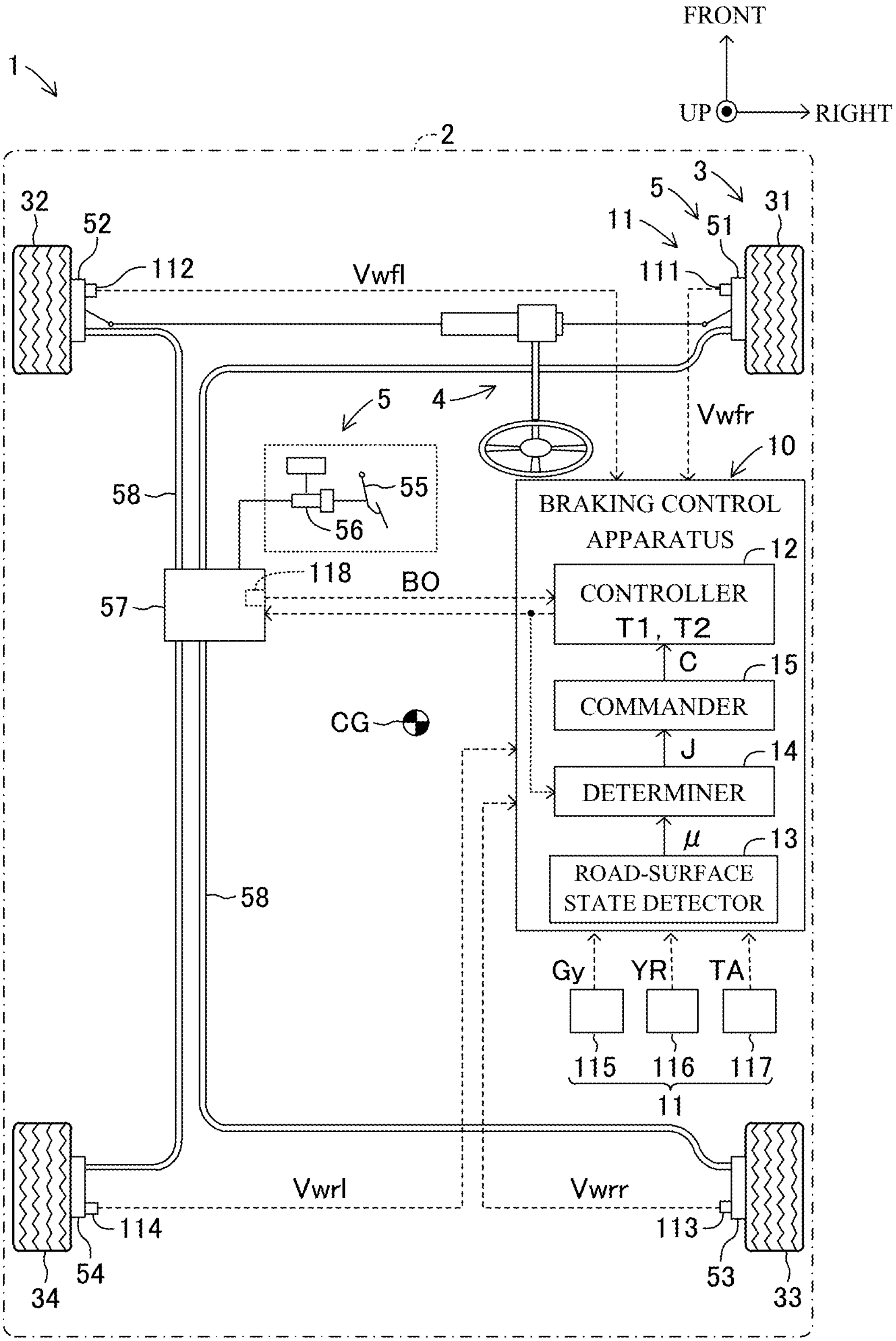
FIG. 1 is a schematic configuration diagram of a vehicle and a vehicle-braking-control apparatus.

The vehicle braking control apparatus 10 is applied to a vehicle 1 illustrated in FIG. 1. Note that the vehicle 1 may travel by manual driving by a driver on board or may travel by autonomous driving. In the embodiment described below, a case where the vehicle 1 travels by manual driving by a driver will be described as an example.

The vehicle 1 includes a vehicle body 2 and wheels 3. The vehicle body 2 is supported by the wheels 3 via a suspension mechanism (not shown). The wheels 3 include a right front wheel 31, a left front wheel 32, a right rear wheel 33, and a left rear wheel 34.

The vehicle 1 includes a steering device 4. In the present preferred embodiment, the steering device 4 steers the right front wheel 31 and the left front wheel 32. The vehicle 1 is configured such that the right front wheel 31 and the left front wheel 32, the right rear wheel 33 and the left rear wheel 34, or the right front wheel 31, the left front wheel 32, the right rear wheel 33, and the left rear wheel 34 are driven by a driving force from a driving force source (an engine, an electric motor, or the like), not shown.

The vehicle 1 further includes a braking device 5 for generating a braking force on each of the wheels 3. The braking device 5 includes a right front wheel brake 51, a left front wheel brake 52, a right rear wheel brake 53, and a left rear wheel brake 54. In the present embodiment, the braking device 5 includes a brake pedal 55, a master cylinder 56, a hydraulic circuit 57, and brake lines 58. The right front wheel brake 51, the left front wheel brake 52, the right rear wheel brake 53, and the left rear wheel brake 54 can be exemplified as disc brakes or drum brakes, and can be configured to enable regenerative braking.

The master cylinder 56 pumps hydraulic oil in response to a braking operation of depressing the brake pedal 55 by the driver. Although detailed illustration is omitted, the hydraulic circuit 57 includes a reservoir, a pump, various valve devices, and the like, and the hydraulic circuit 57 functions as a brake actuator. The hydraulic circuit 57 adjusts the hydraulic pressure of the hydraulic oil added to each of the brake lines 58, for example, in response to an instruction from a controller 12 of the vehicle braking control apparatus 10 described later.

That is, the hydraulic circuit 57 can generate the braking force in each of the right front wheel brake 51, the left front wheel brake 52, the right rear wheel brake 53, and the left rear wheel brake 54 in a pressure increasing mode in which the hydraulic oil pressure is increased. The hydraulic circuit 57 can release the braking force of each of the right front wheel brake 51, the left front wheel brake 52, the right rear wheel brake 53, and the left rear wheel brake 54 in a pressure reduction mode in which the hydraulic pressure is reduced.

As shown in FIG. 1, the vehicle braking control apparatus 10 is mounted on the vehicle 1. The vehicle braking control apparatus 10 includes a sensor group 11, a controller 12, a road-surface state detector 13, a determiner 14, and a commander 15. Here, the vehicle braking control apparatus 10 is configured with a computer device, as a main element, including a CPU, a ROM, a RAM, and various interfaces. The CPU sequentially executes predetermined programs including a braking control program to be described below, and performs reading of data, numerical calculation, output of calculation results, and the like. The ROM stores programs executed by the CPU, maps, and the like. The RAM temporarily stores data and the like. The various interfaces are connected to each of sensors in the sensor group 11.

As illustrated in FIG. 1, the sensor group 11 includes a wheel speed sensor 111, a wheel speed sensor 112, a wheel speed sensor 113, and a wheel speed sensor 114. The sensor group 11 includes a lateral acceleration sensor 115 and a yaw rate sensor 116, and the lateral acceleration sensor 115 and the yaw rate sensor 116 function as a state-quantity detector that detects a state-quantity of the vehicle 1 having a component in a right and left direction of the vehicle 1. The sensor group 11 further includes a steering angle sensor 117 and a brake sensor 118.

The wheel speed sensor 111 detects a wheel speed Vwfr that is a rotational speed of the right front wheel 31. The wheel speed sensor 112 detects a wheel speed Vwfl that is a rotation speed of the left front wheel 32. The wheel speed sensor 113 detects a wheel speed Vwrr that is a rotation speed of the right rear wheel 33. The wheel speed sensor 114 detects a wheel speed Vwrl that is a rotation speed of the left rear wheel 34. In the following description, when the wheel speeds Vwfr, Vwfl, Vwrr, and Vwrl are not distinguished from each other, the wheel speed may be simply referred to as a "wheel speed Vw".

The lateral acceleration sensor 115 detects a lateral acceleration Gy which represents a state occurring in the vehicle 1 and is a state-quantity of the vehicle 1 having a component in the right and left direction of the vehicle 1. The lateral acceleration Gy is the state-quantity occurring in the right and left direction of the vehicle 1. The yaw rate sensor 116 detects a yaw rate YR which represents a state occurring in the vehicle 1 and is the state quantity of the vehicle 1 having a component in the right and left direction of the vehicle 1. The yaw rate YR is the state quantity occurring around a center of gravity CG of the vehicle 1.

The steering angle sensor 117 detects a steering angle TA of each of the right front wheel 31 and the left front wheel 32 steered by the steering device 4. For example, a predetermined relationship is established between the steering angle TA and an operation amount (steering angle) of a steering wheel by the driver. Therefore, the steering angle sensor 117 can detect the steering angle TA based on, for example, the operation amount (steering angle) of the steering wheel.

When the driver performs a braking operation on the brake pedal 55, the brake sensor 118 outputs an operation signal BO indicating an operation state requesting braking. That is, the brake sensor 118 outputs the operation signal BO by detecting the hydraulic oil pressure of the master cylinder 56, the hydraulic oil pressure of each of the plurality of brake lines 58, and the like according to the braking operation on the brake pedal 55.

The controller 12 executes the braking-force-generating control T1 for causing the braking device 5 mounted on the vehicle 1 to generate the braking force in the pressure increasing mode described above. Further, the controller 12 executes a braking-force-release control T2 for causing the braking device 5 to release the braking force in the pressure reduction mode. Then, the controller 12 can switch and execute the braking-force-generating control T1 and the braking-force-release control T2.

Here, in the present embodiment, the controller 12 switches and executes the braking-force-generating control T1 and the braking-force-release control T2 in accordance with the well-known anti-skid control (also referred to as "ABS control") of preventing the rotation stop states, that is, the locked states of the wheels 3. The controller 12 outputs, to the determiner 14, information indicating the braking-force-generating control T1 or the braking-force-release control T2 that is currently executed in the vehicle 1.

In a normal state, the controller 12 determines a required deceleration based on the operation amount of the brake pedal 55 by the driver, the wheel speeds Vw of the wheels 3, a vehicle speed Vb of the vehicle 1 that can be estimated using the wheel speeds Vw, and the like. Then, the controller 12 controls the hydraulic circuit 57 to generate the braking force in each of the wheels 3 so that an actual deceleration becomes equal to the required deceleration. On the other hand, when it is determined that the wheel 3 is in the locked state based on the wheel speed Vw and the vehicle speed Vb, the controller 12 controls the hydraulic circuit 57, for example, by switching from the braking-force-generating control T1 to the braking-force-release control T2 according to the ABS control.

The road-surface state detector 13 detects a state of a road surface with which each of the wheels 3 is in contact, more specifically, a physical-quantity indicating a state between the wheels and the road surface, using the wheel speeds Vw detected by the wheel speed sensors 141, 142, 143, and 144. That is, the road-surface state detector 13 functions as a physical-quantity detector, and estimates and detects a friction coefficient μ representing a magnitude of friction of the road surface with which each of the wheels 3 is in contact as the physical-quantity.

Here, for the estimation calculation of the friction coefficient μ, a well-known calculation method that has been widely adopted in the related art can be adopted. Therefore, an example of the estimation calculation of the friction coefficient μ by the road-surface state detector 13 will be briefly described below. The road-surface state detector 13 estimates the vehicle speed Vb based on the wheel speed Vw. Then, the road-surface state detector 13 estimates and calculates a slip ratio S of each wheel 3 by dividing the deviation between the wheel speed Vw and the vehicle speed Vb by the vehicle speed Vb. The slip ratio S can be estimated and calculated based on an acceleration of the wheel speed Vw, a longitudinal acceleration or a lateral acceleration Gy of the vehicle 1, or the like.

Figure 2:
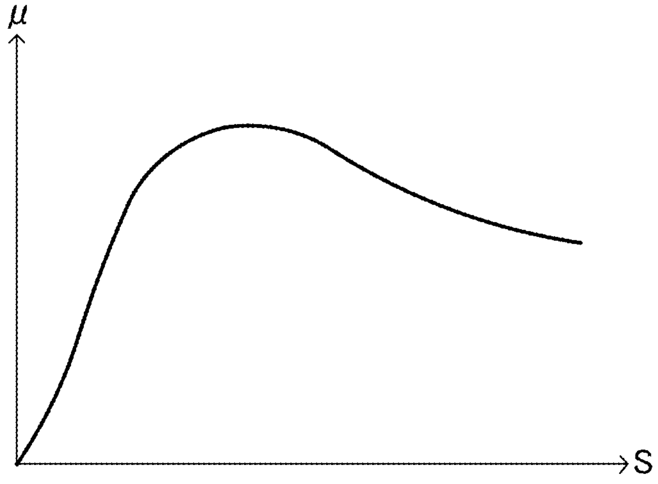
FIG. 2 is a graph showing a relationship between a slip ratio and a friction coefficient.

Then, the road-surface state detector 13 estimates and calculates the friction coefficient μ of the road surface corresponding to the calculated slip ratio S of the wheel 3 based on the S-u characteristic as shown in FIG. 2 predetermined as a relationship between the friction coefficient μ of the road surface and the slip ratio S of the wheel 3. Then, the road-surface state detector 13 outputs the estimated and detected friction coefficient μ of the road surface to the determiner 14.

As illustrated in FIG. 1, the determiner 14 determines whether an unstable behavior, for example, a spin behavior, a drift behavior, or the like, with rotation around a rotation axis that is a rotation axis along a vertical direction and passes through the center of gravity CG of the vehicle 1 occurs or not in the vehicle 1. The determiner 14 determines that the unstable behavior with rotation is occurring in the vehicle 1 when a determination value D determined by using both the lateral acceleration Gy (as the state-quantity) representing the state occurring in the vehicle 1 and the friction coefficient μ (as the physical-quantity) representing the state of the road surface with which the wheels 3 are in contact is equal to or greater than a predetermined value D0.

Here, the determination value D of the present embodiment is a ratio of the state-quantity to the physical-quantity, that is, a ratio (Gy/u) of the lateral acceleration Gy to the friction coefficient μ. The determination value D tends to increase as the friction coefficient μ decreases or the lateral acceleration Gy increases. Therefore, when the determination value D increases, the unstable behavior with rotation is likely to occur as the behavior of the vehicle 1. On the other hand, the determination value D tends to decrease as the friction coefficient μ increases or the lateral acceleration Gy decreases. Therefore, when the determination value D decreases, the behavior of vehicle 1 is likely to return from the unstable behavior to the stable behavior.

As will be described later, the determiner 14 of the present embodiment determines whether a first situation (see FIG. 3) in which a decrease gradient a of the vehicle speed Vb of the vehicle 1 (vehicle body 2) becomes smaller than a decrease gradient of the wheel speed Vw of the wheel 3 of the vehicle 1 and the difference between the wheel speed Vw and the vehicle speed Vb becomes larger has occurred or not. As described later, in a state in which the first situation occurs, the determiner 14 of the present embodiment determines whether a second situation (see FIG. 3) in which the braking-force-release control T2 is being executed in the braking device 5 according to the wheel speed Vw, more specifically, according to the locked state of the wheel 3 occurs or not. Then, when the first situation and the second situation occur and a situation in which the determination value D is equal to or greater than the predetermined value D0 continues for a certain period of time, the determiner 14 of the present embodiment determines that the unstable behavior with rotation occurs in the vehicle 1 and outputs determination information J to the commander 15.

The determination information J is input to the commander 15 from the determiner 14. When the commander 15 determines that the unstable behavior occurs in the vehicle 1 according to the determination information J, the commander 15 outputs a braking command C for instructing the braking device 5 to generate the braking force to the controller 12. Accordingly, the controller 12 causes the braking device 5 to generate the braking force by executing the braking-force-generating control T1.

In the present embodiment, the controller 12 ends the braking-force-release control T2 being executed (continued) in the second situation in accordance with the braking command C. That is, the controller 12 terminates the anti-skid control and promptly executes the braking-force-generating control T1. Thus, the right front wheel brake 51, the left front wheel brake 52, the right rear wheel brake 53, and the left rear wheel brake 54 of the braking device 5 generate braking forces in all the wheels 3.

Figure 3:
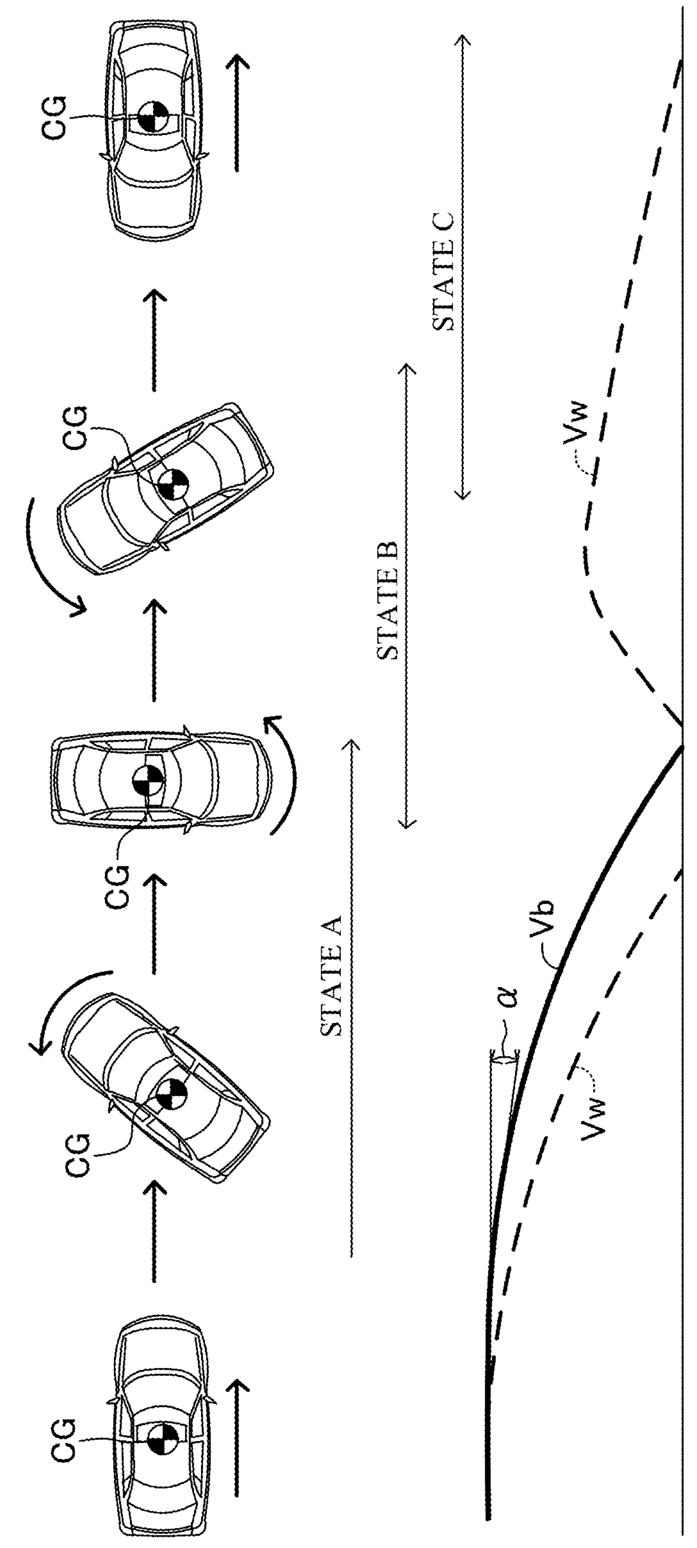
FIG. 3 is a diagram for explaining an unstable behavior with rotation.

Next, there will be described the unstable behavior with rotation that occurs in the vehicle 1. As shown in FIG. 3, in a state where the vehicle 1 is traveling straight, when the friction coefficient μ of the road surface decreases, the lateral acceleration Gy is generated in the vehicle 1, or the steering angle TA increases, there is a possibility that the unstable behavior, for example, a spin behavior with rotation around the rotation axis passing through the center of gravity CG, occurs in the vehicle 1.

In this case, in a "state A" illustrated in FIG. 3, a reaction force input from the road surface to the wheel 3 decreases as the vehicle 1 starts to rotate (or turn) and gradually approaches a right angle direction perpendicular to a traveling direction. As a result, in the "state A", the wheel speed Vw of the wheel 3 rapidly decreases as indicated by a long dashed line. Then, when the vehicle 1 turns to the right angle direction, the reaction force from the road surface disappears, and as a result, the wheel speed Vw becomes "0", that is, the wheel 3 is in the rotation stop state.

Here, in the "state A", when the driver performs the braking operation on the brake pedal 55, the controller 12 attempts to execute the braking-force-generating control T1 in the pressure increasing mode in the initial stage based on the operation signal BO. However, when the state in which the wheel speed Vw is "0", in other words, the locked state in which the slip ratio S has increased occurs, the controller 12 executes the braking-force-release control T2 in the pressure reduction mode according to the anti-skid control.

When the unstable behavior with rotation occurs in the vehicle 1, as indicated by a thick solid line in FIG. 3, the vehicle speed Vb decreases at the decrease gradient a determined based on the friction coefficient μ of the road surface in order to avoid a rapid decrease in speed. On the other hand, when the unstable behavior with rotation occurs in the vehicle 1, the reaction force from the road surface to the wheel 3 decreases as described above, and thus the wheel speed Vw decreases with a decrease gradient larger than the decrease gradient a. Therefore, when the unstable behavior with rotation occurs in the vehicle 1, the vehicle speed Vb does not catch up with the decreasing wheel speed Vw and deviates upward from the wheel speed Vw.

When the vehicle speed Vb deviates upward from the wheel speed Vw and the wheel speed Vw deviates from the vehicle speed Vb, the wheel speed Vw does not reach the vehicle speed Vb. As a result, since the locked state of the wheel 3 continues, the controller 12 continues the braking-force-release control T2 in the pressure reduction mode according to the anti-skid control. As a result, in the "state A", the driver feels a sense of discomfort, that is, a so-called plate brake feeling, in the decrease in the vehicle speed Vb with respect to the braking operation on the brake pedal 55.

Further, in the "state B" of FIG. 3, as indicated by the long dashed line, for example, the input of the reaction force from the road surface is restored in some of the wheels 3, whereby the wheel speed Vw increases and the locked state is resolved. However, even if the locked state is resolved, the unstable behavior may continue unintentionally. Then, in the "state C" of FIG. 3, for example, even if the braking-force-generating control T1 is executed on some of the wheels 3 in which the locked state has been resolved, the braking force for stopping the vehicle 1 traveling backward, in other words, the deceleration is insufficient, and as a result, the driver feels a feeling of free running or a feeling of acceleration.

That is, when the "state A", the "state B", and the "state C" illustrated in FIG. 3 occur in this order, in the "state A", a "first situation" in which the decrease gradient a of the vehicle speed Vb of the vehicle body 2 of the vehicle 1 is smaller than the decrease gradient of the wheel speed Vw of the wheel 3 of the vehicle 1 and the difference between the wheel speed Vw and the vehicle speed Vb is large occurs. In the "state A", a "second situation" in which the braking-force-release control T2 corresponding to the rotation stop state of the wheel 3 is executed in the braking device 5 occurs.

Then, for example, in the above-described conventional control apparatus, in a case where the occurrence of the "first situation" is set as a first condition and the occurrence of the "second situation" is set as a second condition, when the first condition and the second condition are satisfied, the unstable behavior with rotation around the rotation axis passing through the center of gravity CG is determined. In order to satisfy the second condition, for example, the braking-force-release control T2 in the pressure reduction mode needs to be continued for a relatively long time by the braking operation on the brake pedal 55 performed by the driver. Therefore, when the braking operation of the brake pedal 55 by the driver is delayed, for example, the determination of the unstable behavior with rotation in the "state A" may be delayed, and after the unstable behavior with rotation is determined, for example, the switching to the braking-force-generating control T1 in the "state B" and the "state C" may also be delayed.

Figure 4:
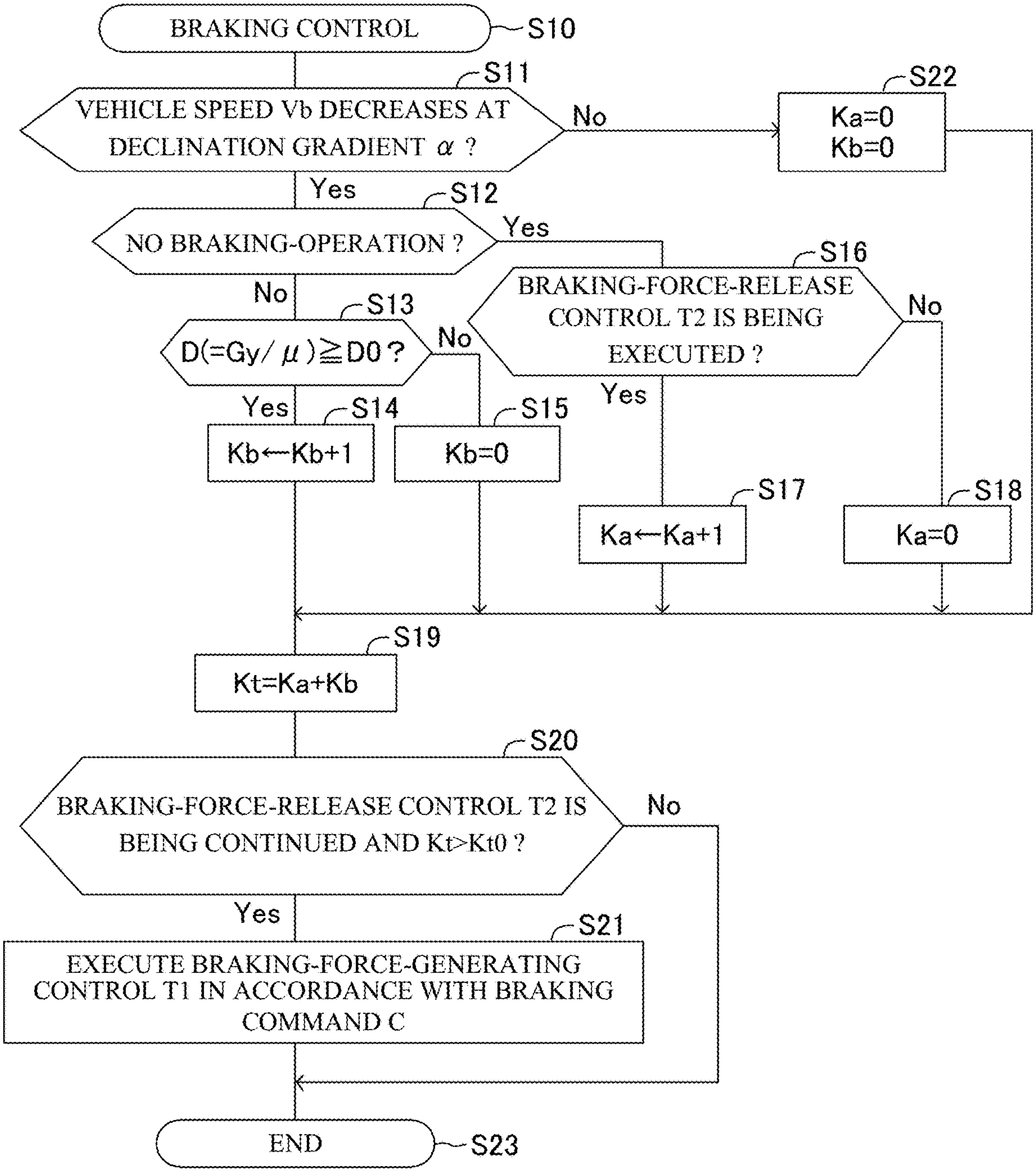
FIG. 4 is a flowchart of a braking control program.

Therefore, the vehicle braking control apparatus 10 of the present embodiment executes the braking control program illustrated by the flowchart of FIG. 4 so as to early determine the unstable behavior with rotation before the driver performs the braking operation on the brake pedal 55. The vehicle braking control apparatus 10 (more specifically, the CPU of the computer device constituting the vehicle braking control apparatus 10) starts execution of the braking control program in step S10.

In subsequent step S11, the determiner 14 of the vehicle braking control apparatus 10 determines whether or not the vehicle speed Vb is decreasing at the decreasing gradient a. In other words, the determiner 14 determines whether or not the "first situation" occurs in the vehicle 1. When the determiner 14 determines "Yes" because the vehicle speed Vb decreases at the decreasing gradient a, the vehicle braking control apparatus 10 executes the process of step S12.

In step S12, the controller 12 of the vehicle braking control apparatus 10 determines whether or not the driver is not performing a braking operation on the brake pedal 55 based on the operation signal BO from the brake sensor 118. When the controller 12 determines "No" because the driver is not performing the braking operation on the brake pedal 55, the vehicle braking control apparatus 10 executes the process of step S13.

In step S13, the determiner 14 determines whether or not the determination value D (=Gy/u) is equal to or greater than the predetermined value D0. Therefore, the determiner 14 acquires the lateral acceleration Gy from the lateral acceleration sensor 115 and acquires the friction coefficient μ of the road surface from the road-surface state detector 13. When the determiner 14 determines that the determination value D is equal to or greater than the predetermined value D0 and determines "Yes", the vehicle braking control apparatus 10 increments a value of a pre-braking counter value Kb by "1" in step S14. When the determiner 14 determines that the determination value D is less than the predetermined value D0 and determines "No", the vehicle braking control apparatus 10 sets the value of the pre-braking counter value Kb to "0" in step S15. Then, the vehicle braking control apparatus 10 executes the process of step S19 after the process of step S14 or step S15.

On the other hand, in step S12, when the driver performs the braking operation on the brake pedal 55 and the controller 12 determines "Yes", the vehicle braking control apparatus 10 executes the process of step S16. In step S16, the determiner 14 determines whether or not the braking-force-release control T2 is being executed by the controller 12. In other words, the determiner 14 determines whether or not the "second situation" occurs in the vehicle 1.

When the braking-force-release control T2 is being executed and the determiner 14 determines "Yes", the vehicle braking control apparatus 10 increments the value of a post-braking counter value Ka by "1" in step S17. When the determiner 14 determines "No" because the braking-force-release control T2 is not being executed, the vehicle braking control apparatus 10 sets the value of the post-braking counter value Ka to "0" in step S18. Then, the vehicle braking control apparatus 10 executes the process of step S19 after the process of step S17 or step S18.

In step S19, the vehicle braking control apparatus 10 calculates a total counter value Kt by adding the post-braking counter value Ka and the pre-braking counter value Kb. Then, the vehicle braking control apparatus 10 executes the process of step S20.

In step S20, the determiner 14 determines whether or not the braking-force-release control T2 is being continued by the controller 12 and the total counter value Kt is larger than the predetermined value Kt0. That is, when the total counter value Kt to which the pre-braking counter value Kb indicating that the determination value D is equal to or greater than the predetermined value D0 is added is greater than the predetermined value Kt0 in step S19, the "first situation" occurs in accordance with the determination process of step S11, and the "second situation" occurs in accordance with the determination process of step S16, the determiner 14 of the present embodiment determines "Yes" because the unstable behavior with rotation occurs in the vehicle 1. The determiner 14 outputs, to the commander 15, the determination information J indicating that the unstable behavior with rotation is occurring, and the vehicle braking control apparatus 10 executes the process of step S21.

In step S21, the commander 15 of the vehicle braking control apparatus 10 outputs the braking command C to the controller 12 according to the determination information J acquired in step S20. As a result, the controller 12 terminates the braking-force-release control T2 in accordance with the braking command C, in other words, terminates the anti-skid control, and promptly executes the braking-force-generating control T1, thereby causing the braking device 5 to generate the braking force. Then, the vehicle braking control apparatus 10 temporarily ends the execution of the braking control program in step S23, and starts the execution of the program again in step S10 after a predetermined short time elapses.

In step S20, when the determiner 14 determines that the unstable behavior with rotation does not occur in the vehicle 1, the vehicle braking control apparatus 10 temporarily ends the execution of the program in step S23. After a lapse of the predetermined short time, the execution of the program is started again in step S10.

On the other hand, when the vehicle speed Vb does not decrease at the decreasing gradient a, that is, the "first situation" does not occur and the determiner 14 determines "No" in step S11, the vehicle braking control apparatus 10 executes the process of step S22. In step S22, the vehicle braking control apparatus 10 sets the post-braking counter value Ka to "0" and sets the pre-braking counter value Kb to "0" corresponding to the situation in which the "first situation" does not occurs.

In this case, the total counter value Kt calculated in step S19 is also "0", and in the determination processing of subsequent step S20, the total counter value Kt is equal to or less than the predetermined value Kt0, so that the determination is "No". Therefore, the vehicle braking control apparatus 10 temporarily ends the execution of the program in step S23, and starts the execution of the program again in step S10 after the predetermined short time elapses.

As can be understood from the above description, the vehicle braking control apparatus 10 includes the controller 12 capable of switching between the braking-force-generating control T1 for causing the braking device 5 mounted on the vehicle 1 to generate the braking force and the braking-force-release control T2 for releasing the braking force generated by the braking device 5 and executing the braking-force-generating control T1 and the braking-force-release control T2, and the determiner 14 configured to determine whether or not the unstable behavior with rotation around the rotation axis along the vertical direction (the rotation axis passing through the center of gravity CG of the vehicle 1) is occurring in the vehicle 1 based on the determination value D determined by using the lateral acceleration Gy representing the state occurring in the vehicle 1 and the friction coefficient μ representing the state of the road surface with which the wheels 3 of the vehicle 1 are in contact. The controller 12 executes the braking-force-generating control T1 in accordance with the determination of the unstable behavior to cause the braking device 5 to generate the braking force.

In this case, in the vehicle braking control apparatus 10, the determiner 14 determines that the unstable behavior is occurring when the determination value D is equal to or greater than the predetermined value D0, the first situation in which the decrease gradient a of the vehicle speed Vb of the vehicle 1 becomes smaller than the decrease gradient of the wheel speed Vw of the wheel 3 and the vehicle speed Vb becomes larger than the wheel speed Vw, and the second situation in which the braking-force-release control T2 is being executed in accordance with the wheel speed Vw in the braking device 5 occur.

In these cases, the vehicle braking control apparatus 10 includes the sensor group 11 as a state-quantity detector that detects the state-quantity indicating the state occurring in the vehicle 1 and having the component in the right and left direction of the vehicle 1, and the road-surface state detector 13 as a physical-quantity detector that detects the physical-quantity indicating the state between the wheels 3 and the road surface, and the determiner 14 that performs the determination of the ratio of the state-quantity to the physical-quantity using the determination value D. In this case, the state-quantity is the lateral acceleration Gy which is one of the lateral acceleration Gy and the yaw rate YR occurring in the vehicle 1, and the physical-quantity is the friction coefficient μ representing the magnitude of friction of the road surface with which the wheel 3 are in contact.

Further, in these cases, in the vehicle braking control apparatus 10, the controller 12 executes the braking-force-generating control T1 and the braking-force-release control T2 in accordance with the anti-skid control of preventing the occurrence of the locked state in which the rotation of the wheel 3 is stopped, and when the determiner 14 determines that the unstable behavior occurs during the execution of the braking-force-release control T2 in accordance with the anti-skid control, the controller 12 terminates the anti-skid control and executes the braking-force-generating control T1.

According to these, in the vehicle braking control apparatus 10, the determiner 14 can determine whether or not the unstable behavior with rotation occurs in the vehicle 1 based on the determination value D. That is, in the vehicle braking control apparatus 10, before braking, that is, before the brake pedal 55 is braked by the driver, the determiner 14 can determine the occurrence of the unstable behavior with rotation of the vehicle 1 at an early stage. As a result, when the braking-force-release control T2 is being executed, the vehicle braking control apparatus 10 can cause the controller 12 to end the braking-force-release control T2, in other words, end the anti-skid control, and quickly execute the braking-force-generating control T1. As a result, the vehicle braking control apparatus 10 can quickly stop the vehicle 1 in which the unstable behavior with rotation occurs.

Further, the determiner 14 can determine whether or not the unstable behavior with rotation occurs in the vehicle 1 using the determination value D (=Gy/u) representing the ratio of the lateral acceleration Gy to the friction coefficient μ. Therefore, the determiner 14 can secure robustness and execute the determination even when the friction coefficient μ is small, for example. Further, for example, the determiner 14 can also determine whether or not the vehicle 1 returns from the unstable behavior with rotation to a stable behavior as the determination value D decreases. That is, the vehicle braking control apparatus 10 can secure a room for behavior recovery in the determination of the unstable behavior with rotation.

Next, there will be described a modification. In the modified example, the vehicle braking control apparatus 10 determines whether or not the unstable behavior with rotation occurs in the vehicle 1 based on the determination value D regardless of whether or not the "first situation" and the "second situation" occur in the vehicle 1, in other words, regardless of whether or not braking is performed.

Figure 5:
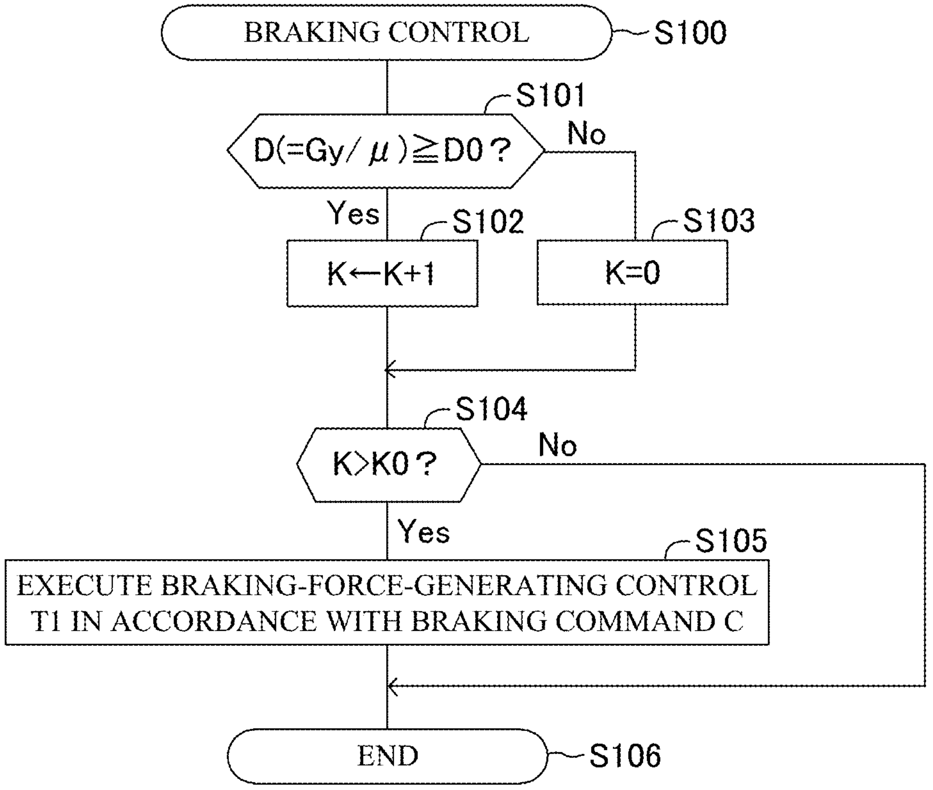
FIG. 5 is a flowchart of a braking control program according to a modification.

In the modified example, the vehicle braking control apparatus 10 executes the braking control program represented by the flowchart of FIG. 5. That is, the vehicle braking control apparatus 10 starts execution of the program in step S100, and the determiner 14 determines whether or not the determination value D is equal to or greater than the predetermined value D0 in subsequent step S101.

When the determination value D is equal to or greater than the predetermined value DO and the determiner 14 determines "Yes", the vehicle braking control apparatus 10 increments the value of a counter value K by "1" in step S102. When the determination value D is less than the predetermined value D0 and the determiner 14 determines "No", the vehicle braking control apparatus 10 changes the value of the counter value K to "0" in step S103. Then, the vehicle braking control apparatus 10 executes the process of step S104 after the process of step S102 or step S103.

In step S104, the determiner 14 determines whether the counter value K is larger than a predetermined value KO. That is, when the counter value K is larger than the predetermined value KO, in other words, when a state in which the ratio of the lateral acceleration Gy to the friction coefficient μ is large continues for a certain period of time or more, the determiner 14 determines "Yes" because the unstable behavior with rotation occurs in the vehicle 1. When the determination information J is output to the commander 15 by the determiner 14, the vehicle braking control apparatus 10 executes the process of step S105.

In step S105, the commander 15 outputs the braking command C to the controller 12 according to the determination information J. Thus, the controller 12 executes the braking-force-generating control T1 in accordance with the braking command C to cause the braking device 5 to generate the braking force. Then, the vehicle braking control apparatus 10 temporarily ends the execution of the braking control program in step S106, and starts the execution of the program again in step S100 after the predetermined short time elapses. In step S104, when the determiner 14 determines that the unstable behavior with rotation does not occur, the vehicle braking control apparatus 10 temporarily ends the execution of the program in step S106, and starts the execution of the program again in step S100 after the predetermined short time elapses.

Therefore, in the modified example, regardless of the presence or absence of braking, for example, even if the braking operation is not performed by the driver, the vehicle braking control apparatus 10 can determine whether or not the unstable behavior with rotation is occurring in the vehicle 1. Therefore, also in the modified example, the same effect as that of the above-described embodiment can be expected.

Further, in the embodiment and the modified example described above, the determiner 14 determines whether or not the unstable behavior with rotation of the vehicle 1 occurs based on the determination value D using the friction coefficient μ and the lateral acceleration Gy. However, the yaw rate YR detected by the yaw rate sensor 116 may be used instead of the lateral acceleration Gy. In this case, the determiner 14 can use the determination value representing the ratio of the yaw rate YR to the friction coefficient μ to determine whether or not the unstable behavior with rotation of the vehicle 1 is occurring, as in the embodiment and the modification described above.

The lateral acceleration Gy and the yaw rate YR are the state-quantities detected as the vehicle 1 turns (rotates). Therefore, it can be said that the lateral acceleration Gy and the yaw rate YR have a predetermined relationship with the steering angle TA, which is the state-quantity for turning (rotating) the vehicle 1. Therefore, the determiner 14 can determine whether or not the unstable behavior with rotation occurs in the vehicle 1 based on the determination value expressed by the relational expression between the lateral acceleration Gy or the yaw rate YR and the steering angle TA. Also in this case, the same effects as those of the above-described embodiment and modifications can be expected.

Further, in the above-described embodiment, the controller 12 executes the braking-force-generating control T1 or the braking-force-release control T2 according to the ABS control. Instead of or in addition to this, the controller 12 can also execute the braking-force-generating control T1 or the braking-force-release control T2 according to a known vehicle stability control (also referred to as "VSC") that stabilizes a traveling behavior of the vehicle 1. In particular, in the modification described above, when the determiner 14 determines that the unstable behavior with rotation occurs in the vehicle 1, the controller 12 can execute the braking-force-generating control T1 according to the VSC.

It can be said that the vehicle braking control apparatus 10 includes the sensor group 11 and the computer. It can also be said that the computer is configured to execute the functions (or processes) of the controller 12, the road-surface state detector 13, the determiner 14, and the commander 15 described above.

What is claimed is:

1. A vehicle braking control apparatus, comprising:

a controller configured to switch between a braking-force-generating control and a braking-force-release control so as to execute the braking-force-generating control and the braking-force-release control, the controller causing a braking device mounted on a vehicle to generate a braking force in the braking-force-generating control and causing the braking device to release the generated braking force in the braking-force-release control; and a determiner configured to determine whether an unstable behavior with rotation around a rotation axis along a vertical direction occurs or not in the vehicle based on a determination value determined by a state occurred in the vehicle and a state of a road surface with which wheels of the vehicle are in contact, wherein the controller causes the braking device to generate the braking force by executing the braking-force-generating control when the determiner determines that the unstable behavior occurs, wherein the determiner is configured to determine that the unstable behavior occurs in a case where the determination value is equal to or greater than a predetermined value, and wherein the determiner is configured to further determine that the unstable behavior occurs in (i) a first situation in which a vehicle speed becomes greater than a wheel speed while a decrease gradient of the vehicle speed becomes smaller than that of the wheel speed and (ii) a second situation in which the braking-force-release control is being executed in the braking device in accordance with the wheel speed.

2. The vehicle braking control apparatus according to claim 1, further comprising:

a state-quantity detector configured to detect a state quantity having a component in a right and left direction of the vehicle and indicating the state occurring in the vehicle; and a physical quantity detector configured to detect a physical quantity indicating a state between the wheels and the road surface, wherein the determination value is a ratio of the state quantity to the physical quantity physical quantity and the determiner is configured to determine whether the unstable behavior occurs based on the determination value.

3. The vehicle braking control apparatus according to claim 2, wherein the state quantity is one of a lateral acceleration and a yaw rate occurring in the vehicle, and wherein the physical quantity is a friction coefficient indicating a magnitude of friction of the road surface with which the wheels of the vehicle are in contact.

* * * * *